United States Patent
Barzilai et al.

(10) Patent No.: US 7,536,424 B2
(45) Date of Patent: May 19, 2009

(54) SYSTEM AND METHODS FOR EFFICIENTLY MANAGING INCREMENTAL DATA BACKUP REVISIONS

(76) Inventors: Yoram Barzilai, 13 Ostrovsky Str., Raanana (IL) 43371; Orly Barzilai, 13 Ostrovsky Str., Raanana (IL) 43371

(*) Notice: Subject to any disclaimer, the term of this patent is extended or adjusted under 35 U.S.C. 154(b) by 844 days.

(21) Appl. No.: 10/837,847

(22) Filed: May 2, 2004

(65) Prior Publication Data
US 2005/0246398 A1    Nov. 3, 2005

(51) Int. Cl.
*G06F 17/30* (2006.01)

(52) U.S. Cl. .............. 707/204; 707/101; 707/102; 707/103 R; 707/205

(58) Field of Classification Search .......... 707/1–10, 707/100–104.1, 200–206
See application file for complete search history.

(56) References Cited

U.S. PATENT DOCUMENTS
2003/0158831 A1* 8/2003 Zaremba ............... 707/1

* cited by examiner

*Primary Examiner*—Isaac M Woo
(74) *Attorney, Agent, or Firm*—Dalina Law Group, P.C.

(57) ABSTRACT

A system and methods for building an efficient incremental data backup system capable of managing high frequency backups sessions, and capable of efficiently expiring backup revisions and locating the useless data elements is disclosed. A reduced set of data elements that have a non-zero probability of becoming redundant when a backup revision expires is prepared while each backup revision is being processed by the backup system. The backup system also maintains data structures, which reduce the number of searches that should be performed for each such data element before it can be realized that the data element is exclusively needed to support the expired backup revision, and therefore could be removed from the second tier storage.

7 Claims, 13 Drawing Sheets

| | 305 | 306-1 | 306-2 | 306-3 | 306-4 | 306-5 | 306-6 |
|---|---|---|---|---|---|---|---|
| 304-1 | 308 | 42F4 | 42F4 | 42F4 | 42F4 | 42F4 | 42F4 |
| 304-2 | 310 | AAEB | AAEB | AAEB | AAEB | AAEB | AAEB |
| 304-3 | 312 | 3EC0 | 3EC0 | 3EC0 | 3EC0 | 3EC0 | 3EC0 |
| 304-4 | 314 | | AAEB | AAEB | AAEB | AAEB | AAEB |
| 304-5 | ... | ... | ... | 0 ... | ... | ... | ... |
| 304-6 | 316 | 1D33 | 1D33 | FAE2 | FAE2 | FAE2 | 3EC0 |
| 304-7 | 318 | | | 7E63 | | | |
| 304-8 | 320 | | B70A | B70A | | | |
| 304-9 | 322 | | | ECE5 | | | |
| 304-10 | 324 | | ECE5 | ECE5 | | | |
| 304-11 | 326 | | | D43A | | | |
| 304-12 | 328 | | | AAEB | | | AAEB |
| 304-13 | 330 | 86B7 | 86B7 | | 86B7 | 86B7 | |

*FIG. 3A*

| | 342 | 306-1 |
|---|---|---|
| 340-1 | 308 | 42F4 |
| 340-2 | 310 | AAEB |
| 340-3 | 312 | 3EC0 |
| 340-4 | ... | ... |
| 340-5 | 316 | 1D33 |
| 340-6 | 330 | 86B7 |

*FIG. 3B*

| | 352 | 354 | 356 |
|---|---|---|---|
| 350-1 | 316 | − | FAE2 |
| 350-2 | 316 | + | 3EC0 |
| 350-3 | 328 | + | AAEB |
| 350-4 | 330 | − | 86B7 |

*FIG. 3C*

| | 405 | 406-1 | 406-2 | 406-3 | 406-4 | 406-5 | 406-6 | 406-7 | |
|---|---|---|---|---|---|---|---|---|---|
| 404-1 | 408 | 4A36 | 4A36 | 4A36 | 4A36 | 4A36 | 4A36 | 4A36 | |
| 404-2 | 410 | 18B4 | 18B4 | 18B4 | 18B4 | 18B4 | 18B4 | 18B4 | |
| 404-3 | ... | ... | ... | ... | ... | ... | ... | ... | |
| 404-4 | 412 | D11C | D11C | D11C | D11C | D11C | D11C | D11C | 204 |
| 404-5 | 414 | D43A | D43A | D43A | D43A | D43A | D43A | | |
| 404-6 | 416 | AAEB | AAEB | AAEB | AAEB | AAEB | AAEB | AAEB | |
| 404-7 | 418 | | | | 747B | 747B | | | |
| 404-8 | 420 | | | | D11C | D11C | D11C | | |
| 404-9 | 422 | | | | | | | 617B | |

*FIG. 4*

SYSTEM AND METHODS FOR EFFICIENTLY MANAGING INCREMENTAL DATA BACKUP REVISIONS

CROSS-REFERENCE TO RELATED APPLICATIONS

Not Applicable

STATEMENT REGARDING FEDERALLY SPONSORED RESEARCH OR DEVELOPMENT

Not applicable

FIELD OF THE INVENTION

This invention relates to software that protects data. More specifically it offers improved methods and processes for managing incremental backup and restore operations that involve multiple backup revisions.

BACKGROUND OF THE INVENTION

In the current art there are solutions that offer backup systems that are designed to handle the backup of multiple clients. Each backup client can define a single or multiple backup sets, where a backup-set is a predefined collection of files and folders to be backed up during a backup session.

A data set is the basic unit of data for which the incremental change is recognized by the backup system. Backup systems of the current art can recognize an incremental change on a file level, file fraction level (block level) such as a predefined 4K blocks, or a change to the basic physical storage unit (allocation unit). These systems will copy every data set within the backup set during the first backup session, and during subsequent backup sessions will copy only the data sets that have changed since the last backup run. This method reduces the amount of required storage space and communication bandwidth.

Another technique that is used to further reduce the amount of communication bandwidth and storage space requirements is to store on the backup destination a single copy of each unique data set content, which will be referred to in this document hereafter as stored data element. Each such data set serves as the backup copy for every data set that has an identical content. The identical data sets content can belong to the data set located on the same backup set, or they may belong to data sets located on different backup sets that are either located on the same computer or they can be located on different computers. In the terminology of this document hereunder each data that is stored on the backup system to serve as the backup copy of a data set will be referred to as stored data element.

In an ordinary backup system, in each backup session every data set that belongs to the backed up backup set is copied to the backup storage. In this kind of backup systems there is no problem to reconstruct the backup set, since in every backup session every data set is backed up and the data sets preserve their original relative position on the backup set (directory structure). However, some incremental backup systems of the current art store a data element only for a data set that has changed since the previous backup session, and some as described earlier will also share a stored data element. Therefore, the structure of the backup set cannot be recovered from the actual copied data sets. Hence, for each backup session a full inventory of the backup set is produced and is sent to the backup system as the meta data of the backup session.

These backup set inventories include several parameters that define the data set position and content during the backup session. These parameters include for each data set, the data set address within the backup set and a unique signature that represents the content of the data set with a smaller amount of data (signature). In a case where the incremental backup is done on a file level, the address will include the path to the file. If the incremental backup is done on a block level the above-mentioned address will include the path to the file and the block position within this file. When the incremental backup is done on the basic physical storage unit, the above mention address will include the path to the file and information such as plate, track and sector location where the data set is located.

Recently the backup market presents a strong demand to perform very frequent backup sessions, so if a misfortunate event strikes—the amount of lost data will be minimal. Market led requirement demands to hold for every backup set several backup snapshots on the backup system (second tier storage) before they will be deleted or removed to some longer-term archive (third tier storage). (Each backup snapshot is referred to in this invention as a backup revision.). This is required in order to enable a fast restore from a choice of several backup revisions. Each backup session produces a backup revision that is stored on the backup system. The collection of backup revisions that were taken for a specific backup set and are saved on the second tier storage is considered a 'backup group'.

A life cycle management of the stored data is required in order to keep the second tier storage space from growing endlessly. Therefore a backup revisions retention strategy should be employed. This strategy necessitates the expiration of a backup revision from the second tier storage according to the backup revisions retention strategy. The expired backup revision will have to be deleted from the second tier storage, and in some cases will have to be copied as well to a third tier storage. In most retention strategies, after taking several backup sessions for a certain backup group there will be a need to expire some older backup revision after each new backup session is taken. This is needed to keep the second tier storage space from growing endlessly If for example a backup session needs to be taken for a certain backup set in 30 minutes intervals, and the backup revision retention strategy is set to hold the last 20 backup revisions, then after 10 hours the backup system will have to expire the oldest backup revision whenever a new backup session is taken. During such backup revision expiration process, there is a need to locate the stored data elements that are no longer needed by any of the other non-expired backup revisions that are stored on the second tier storage. This means that on average the backup system will be engaged in each backup session with both accepting the new backup revision, and with expiring an older backup revision from the second tier backup destination.

In an ordinary backup system that backs up the entire data of a backup set in each backup session, there is no problem to identify the files that can be deleted when a certain backup revision is expired. This is because each backup revision has its own storage place on the backup destination, and no other backup revision depends on data backed up during another backup session. However, in the incremental backup system of the current art not every data set content that exists on the backup set is copied to the backup destination during each backup session, and stored data elements that were backed up during a certain backup session could be needed for restoring other backup revisions. As a result of that, it is not simple to locate the stored data elements that are no longer needed to sustain the non-expired backup revisions, and therefore can be deleted.

When the backup system should expire a certain backup revision that is located on the second tier storage, either because of a predetermined retention schedule, or because of an explicit user request, the stored data elements that are exclusively needed by the expired backup revision should be identified as redundant data elements. The redundant stored data elements can then be deleted from the second tier storage to free storage space, or deleted and further archived in another storage (third tier storage).

To implement a solution for this problem, the backup system should check whether every data set that is referenced in the expired backup revision's backup set inventory, exists in any of the full backup set inventories that belongs to the other non-expired backup revisions. Only data sets that have a unique content can have their stored data element deleted from the second tier storage, as they are exclusively needed by the backup revision that is getting expired. This is a very heavy operation that soon becomes a serious bottleneck that limits the backup frequency and the number of data sets that can be backed up by the backup system.

To exemplify the enormity of this task we can look at a medium size backup server that stores 100 backup groups that each holds 10 backup revisions and each backup revision backs up 10,000 data sets on average. That means that it holds 10×100=1000 backup revisions. Then, when a certain backup revision should be expired, and the stored data elements that no longer are needed by any of the remaining backup revisions should be deleted, the backup system should check whether each one of the 10,000 data set content that belongs to the expired backup revision exists in any of the remaining 999 backup revisions by comparing its signature to each one of the 10,000 data set signatures of each backup revision. This will give us 10,000×999×10,000=99,900,000,000 operations. If the backup set inventory is sorted, it will reduce the number of operations to 10,000×999×log 10,000=10,000× 999×13.3=132,867,000 operations, which is still enormous load. Backup system of the current art do not detail the method in which they discard of backup revisions, and they usually suggest to run a 'clean' cycle during non-busy hours.

Reference to existing patent that can further enlighten the current art relevant to our invention include U.S. Publication number US2003/0182301 A1 Sep. 25, 2003, Patterson et al., and U.S. Pat. No. 5,778,395 Jul. 7, 1998 Whiting et al.

SUMMARY OF THE INVENTION

The present invention disclose system and methods for efficiently managing incremental data backup revisions, capable of running high frequency backup sessions, and to efficiently maintain the second tier storage space. The system and methods disclosed in this invention are able to add and expire backup revisions efficiently, while identifying the stored data elements that become redundant as a result of expiring a backup revision. It updates for each new backup session data structures that help to efficiently identify a reduced set of stored data elements that are candidate for delete when a certain backup revision expires. In the preferred embodiment of this invention, a method of managing additional data structure that reduces the load of checking whether a certain delete candidate stored element is redundant indeed is disclosed.

The present invention discloses methods that reduce the number of stored data elements that have to be examined in order to find the redundant stored data elements. This is achieved by identifying, for each backup group a set of 'delete candidate data elements', where each such delete candidate data element has a non-zero probability of becoming a redundant stored data element as a result of an expiration of a backup revision that belongs to that backup group. This set of delete candidate data elements is managed by several methods that are disclosed in this invention, which require a number of operations proportional to the number of data sets that have changed from one backup revision to the other.

This invention also discloses a method, which reduces the search complexity that each delete candidate data element has to undergo in order to verify whether it is redundant. This is done by associating with each delete candidate data element of a certain backup group, a set of backup revisions that belong to the same backup group, which need the delete candidate data element. And by updating a mean that holds for each stored data element, every backup group that one of its non-expired backup revisions needs it. The methods disclosed in this invention to manage these means also requires number of operations proportional to the number of data sets that have changed from one backup revision to the other.

Then when there is a need to check if a certain delete candidate data element of a certain backup group is redundant indeed, a process consistent with this invention is employed. In the first step, the delete candidate stored data element is checked to verify that no backup revision of the same backup group needs it—by using the set of backup revisions that need it. And if during the first step no backup revision was found to need it, the delete candidate data element will be further checked to see that no other backup group needs it—by using the set of backup groups that need it.

These methods reduce the load on the backup server considerably, which allow increasing the backup frequency and the number of supported backup sets. Another result of the increased number of backup sets that can be managed by the same backup system is the decrease of the overall required second tier storage. The overall storage requirement is decreased because the backup system can discard in a timely manner of redundant stored data elements. Other aspects and advantages of the invention will be apparent from the following description and the appended claims.

BRIEF DESCRIPTION OF THE DRAWINGS

The invention will be better understood by reference to the following drawings:

FIG. 3A is a detailed illustration of an exemplary backup set over six backup revisions, in accordance with the present invention.

FIG. 3B is an illustration of a backup set inventory produced for the exemplary backup set of FIG. 3A during TA1, in accordance with the present invention.

FIG. 3C is an illustration of the change backup set inventory produced for the exemplary backup set of FIG. 3A TA6, in accordance with the present invention.

FIG. 4 is a detailed illustration of another exemplary backup set over seven backup revisions, in accordance with the present invention.

It should be noted that identical features in different drawings are shown with the same reference numeral.

DETAILED DESCRIPTION OF THE INVENTION

1. Environment

Figure 1:
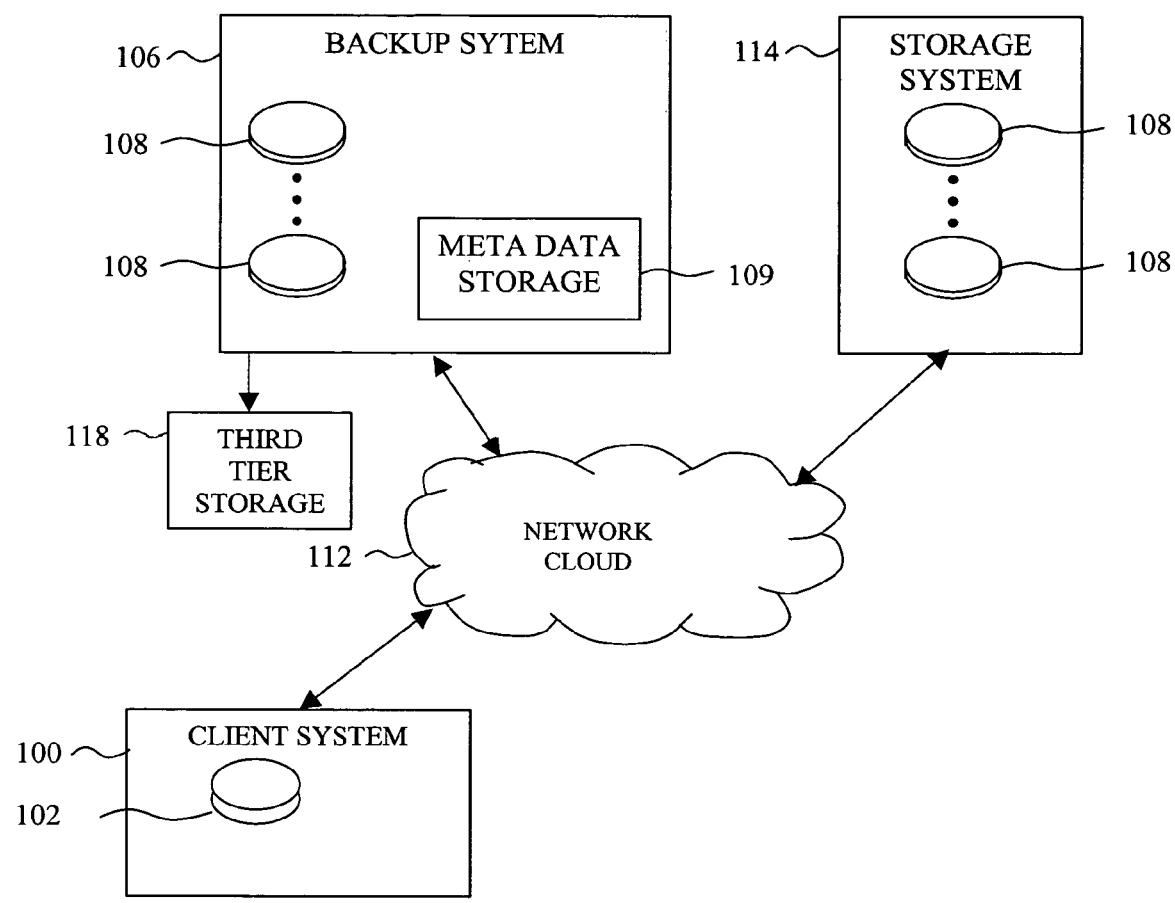
FIG. 1 is a block diagram of an exemplary environment of the present invention

In accordance with an embodiment of the present invention, a new system and methods for building a backup system that efficiently manage incremental data backup revisions, capable of running high frequency backup sessions, and efficiently maintain the second tier storage space, is disclosed here. FIG. 1 is an exemplary environment in which the principle of the present invention can be implemented. A client machine 100, the client's data residing on local storage mean 102 (first tier storage). The client machine is connected over a network cloud 112, to a backup system 106, which is attached to at least one random access storage mean 108 (second tier storage), which can be located in the same backup system or in a separate interconnected storage volume 114.

The backup system 106 has a meta data storage 109. The meta data storage 109 can be saved in one of the storage means 108 or it can be saved in a separate storage mean. The network cloud 112 can be any combination of LAN, SAN, or WAN, it can also be a connection within a digital processing apparatus, or a local bus that connects peripheral devices such as USB, and SCSI bus. Other client machines 100 may be connected over the network cloud 112. The backup system 106 and the client machine 100 may be different parts of the same machine, wherein such a case the network cloud 112 represents the internal bus of the machine. A tape system or any other long-term storage media 118 may serve as a third tier storage, which can be used to archive selected backup revisions. The third tier storage system 118 can be directly connected to the backup system 106 or it can be connected to the network cloud 112.

2. Preparing a Backup Revision

The backup user defines a 'backup set', the backup set may include for example several data sets from within one folder, data sets from several folders, the whole machine's drive, or several computer drives. To each backup set several filters, which reduce the number of data sets belonging to the backup set, can be defined. These filters for example—can filter data sets based on their file type, file size, file creation date, and so forth.

Figures 2A, 2B:
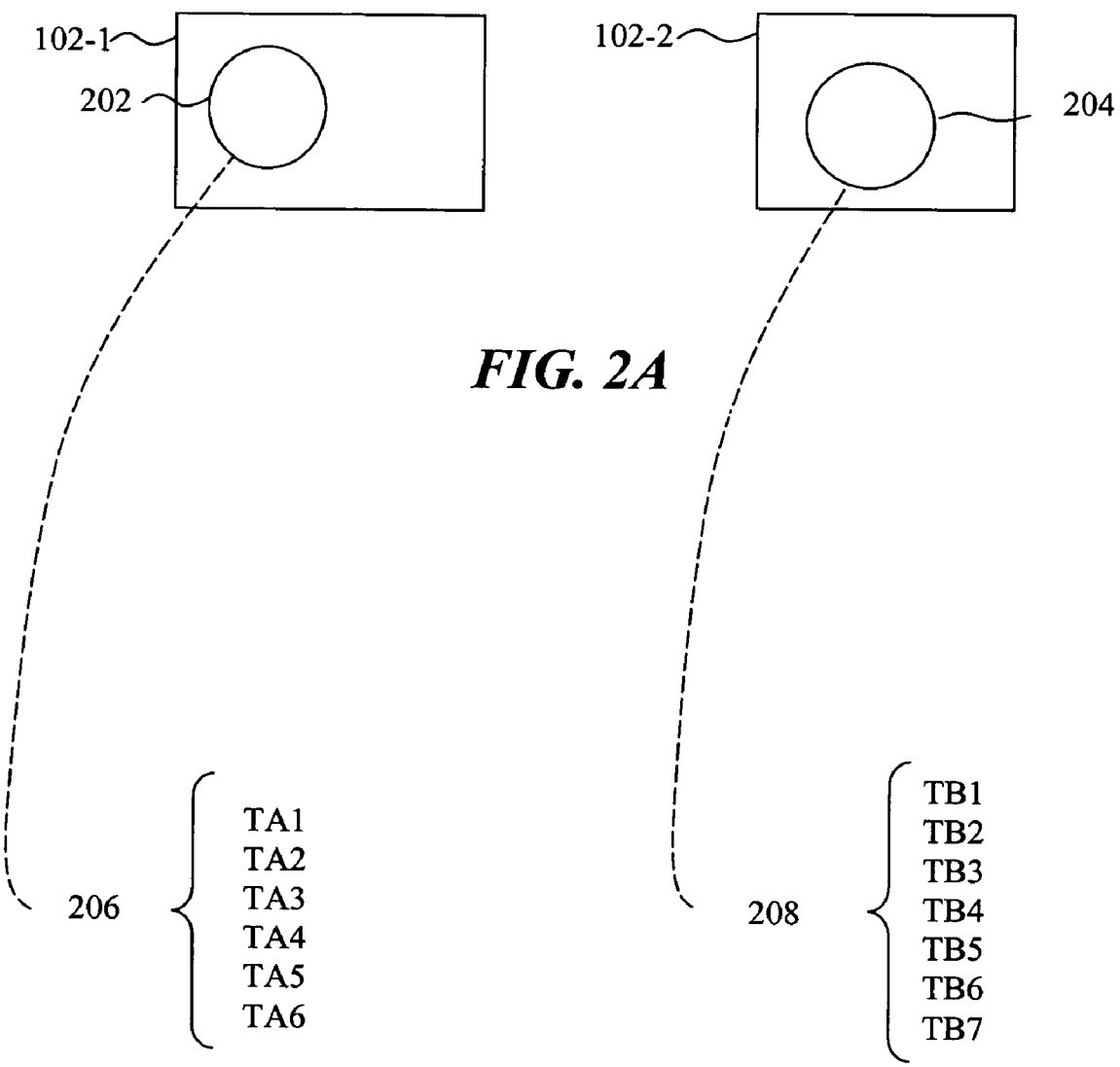
FIG. 2A is an illustration of two backup sets in accordance with the preferred embodiment of the present invention.
FIG. 2B is an illustration of two backup groups, in accordance with the present invention.

Each backup set has it own unique backup set identification. FIG. 2A illustrates the local storage 102 of two backup clients 102-1 and 102-2. For each one of these backup clients a backup set 202 and 204 is defined respectively.

The backup system tags each backup session with a unique identifier. The backup session identifier is composed of the backup-set identifier and a unique sequence based identifier, which can be used to determine the sequence in which the backup sessions were taken. In the preferred embodiment the backup session's unique sequenced based identifier is set by calculating the number of seconds that have past since Dec. $1^{st}$ 2000 01:00 AM. However any other acceptable embodiment of such a measure can be used to determine the sequence in which the backup revisions were taken. A backup session can be invoked by a predetermined schedule, by a user request, or by a change to the backup set. Invoking a backup session is well known to those familiar in the art and will not be detailed here.

The backup system can be configured to hold several backup revisions for each backup set. FIG. 2B illustrates two backup groups 206 and 208; each one of these backup groups holds several backup revisions, which belong to backup sets 202 and 204 respectively. Backup group 206, holds backup revisions TA1-TA6, and backup group 208, holds backup revisions TB1-TB7.

In one embodiment consistent with this invention, for every backup session a 'full backup set inventory' is produced along with a 'change backup set inventory'. The full backup set inventory' contains entries (references) for each data set that was a part of the backup set during the backup session. Each entry contains the data set address, and a signature that uniquely represents the data set. A signature of a data set is a high probability unique representation of the data set with smaller amount of data. A 16-bit (4 bytes) signature is used in the illustrations of this invention in order to simplify the drawings. However, in the preferred embodiment of this invention a 32 bit (8 bytes) signature is used by employing the well-known CRC32 algorithm. However, in another embodiment other types signatures can be used to represent the content of a data set. The change backup set inventory contains only entries detailing the changes to the backup set since the previous backup session. Both types of backup set inventories are tagged with the backup session identifier, and are stored on the meta data storage 109.

FIG. 3B is an illustration of a full backup set inventory that belongs to a certain backup session. Each one of the lines 340-1-340-6 represent entries of the data sets that are present on the backup set 202. Each item in column 342 holds the address of the corresponding data set, and each item in column 306-1 is the signature of the corresponding data set during the backup session. Producing an inventory for a backup session is well known to those familiar in the art and will not be detailed here. Note that full backup set inventory may include additional fields, which are not material for understanding this invention, such as data set creation date, and data set attributes.

FIG. 3A illustrates the signatures of data sets 304-1-304-13 that are part of backup set 202 in several backup sessions. Each one of the columns 306-1-306-6 represents the data sets signature during backup sessions TA1-TA6 respectively. Each item in column 305 indicates the address of the corresponding data set within the backup set.

As can be noted, data sets 304-1, 304-2, and 304-3 did not change over the six backup sessions TA1-TA6, and their signatures were 42F4, AAEB, and 3EC0 respectively. Data set 304-4 did not exist during TA1, and during TA2-TA6 had a signature identical to data set 304-2. The content of data set 304-6 changed twice in TA3 and TA6, where its signature changed from 1D33 to FAE2 and to 3EC0. Data sets 304-7, 304-9, 304-11, 304-12 existed on the backup set only during TA3 (406-3), while data sets 304-8 and 304-10 existed during TA2 and TA3. Data set 304-13 existed and deleted intermediately during several backup session.

Data sets 304-2, 304-4, and 304-12 have the same content as can be seen from their identical signature (AAEB), and data sets 304-9 and 304-10 also have an identical content (ECE5 is the signature of both). Data set 304-6 has during TA6 the same signature (3EC0) as data set 304-3. Note that although there are several data sets that have the same content (signature of AAEB for example), the backup system as will be detailed below, may holds only a single copy of a data set with a signature of AAEB. Line 304-5 represents other data sets, which their content did not change during TA1-TA6.

The full backup set inventory illustrated in FIG. 3B represents the backup session TA1. Note that line 340-4 represent all the other data set that are part of backup set 202 as illustrated in line 304-5 of FIG. 3A.

FIG. 4 illustrates the signatures of data sets 404-1-404-9 that are part of backup set 204 during seven backup sessions TB1-TB7 (as presented in columns 406-1-406-7 respectively). Column 405 represents the addresses of each such data set. Note that data set 404-5 has the same content as data set 304-11 of backup set 202, and that data set 404-6 has the same content as data sets 304-2, 304-4, and 304-12. Also note that data set 404-4 and 404-8 has the same content during TB4-TB6, and that data set 404-9 was introduced to the backup set only during TB7.

If for example the backup revision TA3 of backup group 206 needs to be expired, the stored data elements that are exclusively needed to sustain this backup revision should be identified as redundant stored data elements, which can be deleted from the second tier storage. By evaluating the data sets content during TA3 (FIG. 3 column 306-3), it can be reasoned that except for data sets 304-11 and 304-7, which have the signatures of D43A and 7E63 respectively, all other data set signatures during TA3 appear in other backup revisions. For example the signature of data set 304-10 is ECE5 and it appears also at TA2. So the stored data elements that are needed by the data sets bearing the signatures D43A and 7E63 seems as if they are redundant, as they are exclusively needed by backup revision TA3. However, the stored data elements that is needed by a data set with the signature of DA43 is also needed to sustain the backup revisions TB1-TB6 of backup group 208 (FIG. 4) for data set 404-5, which means that only the stored data element which is needed by a data set with the signature 7E63 is redundant, as it is only needed by data set 304-7 for backup revision TA3, which is getting expired.

Figure 5A:
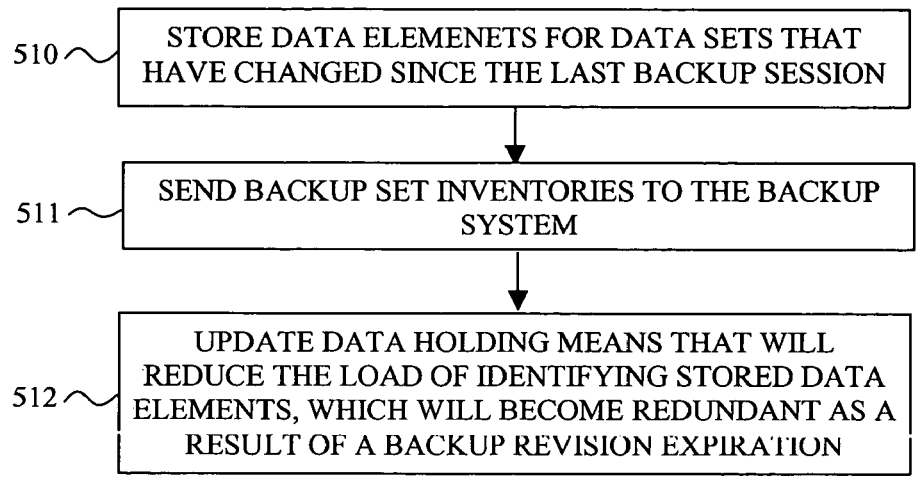
FIG. 5A is a general view of the backup system process during a backup session, in accordance with the present invention.

FIG. 5A illustrates a top-level outlook of the incremental backup process of this invention, as performed after the first full backup session has already been carried out. In Step 510 the backup system stores data elements for a data sets that have changed since the last backup session. A data set is considered, for this matter, to have changed if it has been modified or created since the previous backup session. In the preferred embodiment of storing the data elements consistent with this invention, the stored data element is equal to the content of the data set that has changed. In another embodiment of storing the data element consistent with this invention, which is geared toward a more secure environment, the content of the data set is stored encrypted. Encryption of a data element is well known to those familiar in the art and will not be detailed here.

In one embodiment of storing the data elements on the backup system consistent with this invention, each data element is stored in the backup system in a location that can be found by hashing the data set signature. An example of an hash function to produce the storage location of a data element is: a folder name which comprise of the first letter of the data set signature; and a stored element name that comprise of the data set signature. This enables to keep the stored elements in a generic format that enable sharing a stored element. In the preferred embodiment of storing the data elements on the backup system consistent with this invention, each data element is stored in the backup system in a location that can be found by hashing the data set signature, provided that it is not already located on the backup system in a place which corresponds to the hash value of the data set's content.

In one embodiment of step 511 both the full backup set inventory and the change backup set inventories are sent to the backup system.

In step 512 a data holding means, which catalogues references to stored data elements, backup revisions, and backup groups in a novel structure, is updated. This update is performed in a method, as will be disclosed in this invention, which requires a number of operations (complexity) that is proportional to the number of data sets that has changed during the current backup session. This step is performed for each backup revision that is stored on the backup system in order to decrease the load of locating the stored data elements that will become redundant as a result of expiring a backup revision from the second tier storage 108.

One of said means is a set of 'delete candidate data elements' that exists for each backup group. This set is updated during step 512 by any backup session that belongs to the same backup group. Each item in the delete candidate data elements set of a certain backup group has a non-zero probability of becoming a redundant stored data element—when any backup revision, which is not the most recently taken for that backup group, expires. By supporting a delete candidate data elements set the complexity of locating redundant stored data elements is reduced, because only the stored data elements that are referenced in the delete candidate data element set will have to be considered for delete when a backup revision that belongs to that backup group expires. This is instead of having to consider every stored data element that was needed by the expired backup revision.

In the first embodiment of step 512, set of 'delete candidate data elements' are managed such as to include any stored data element, which is needed by a certain data set in any backup revision and that data set has changed in the subsequent backup session. (A stored data element is said to be needed by a certain data set, if the stored data element was stored for a data set that has an identical signature. A data set that has changed its signature, is any data set that was present on the backup set during a backup session and in a subsequent backup session its content has changed, or that was completely removed from the backup set.) It is clear that a stored data element, which is needed by a data set that has not changed in any backup session, cannot become redundant when a backup revision expires, as it is surely needed by the other backup revisions that will be left in the backup group after the expiration of that backup revision.

As can be reasoned from FIG. 3A, the delete candidate data elements set of backup group 206, after TA6 has been taken, will include references to the stored data elements which is needed by the data sets with the signatures: 1D33, FAE2 that were part of data set 304-6, and to the stored data elements which are needed by the data sets with the signatures 7E63, B70A ECE5, ECE5, D43A, AAEB, 86B7 that were part of data sets 304-7, 304-8, 304-9, 304-10, 304-11, 304-12, and 304-13 respectively. Every such stored data element is needed by a data set that has changed during any of the backup sessions TA1-TA6. This set of delete candidate data elements is considerably smaller than the entire list of stored data elements that are needed by backup revision TA6, which can include tens or even hundreds of thousands of stored data elements.

As described above this document, in accordance with one embodiment of this invention, for each backup session a 'changed backup set inventory' is produced by the backup client 100 to portray the data sets that have changed within the backup set from one backup revision to the following one. Each entry contains the data set address, the signature that uniquely represents the data set, and an attribute indicating the type of change.

FIG. 3C illustrates a change backup set inventory 350 as would be produced for TA6. It contains four change entries 350-1-350-4. Column 352 indicates the address of the data set that have changed, column 354 is the attribute field of the change, and column 356 indicates the data set signature associated with the change. In line 350-1 a minus sign in the attribute column 354 indicates that a data set with a signature as appears on column 356 no longer exists as it did in the previous backup session (TA5) on the data set address as indicated by column 352. A plus sign in the attribute column 354 indicates that during TA6 a data set with a signature as appears on column 356 was found to be added to the backup set 202 in the data set address as indicated by column 352. When a data set content has changed two entries will appear in the change backup set inventory. Both entries will have the same data set address, while the first address will have a minus sign in the attribute column 354 and the old signature of the data set in column 356, and the second item will have a plus sign in the attribute column 354 and the new signature of the data set in column 356. Note that entries 350-1 and 350-2 illustrate such a change.

Figure 6:
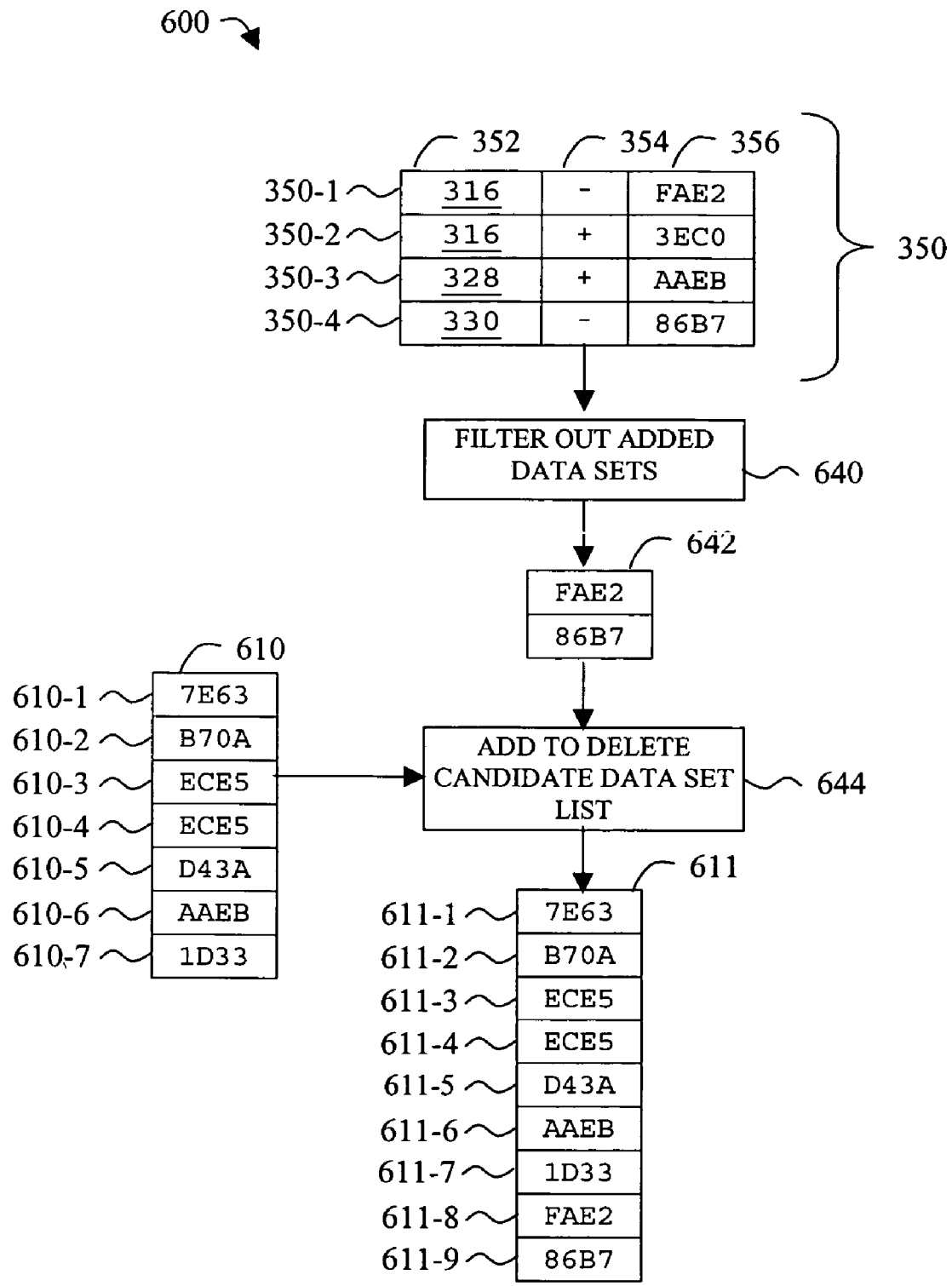
FIG. 6 illustrates for one embodiment, the process of producing delete candidate data sets for an exemplary change backup set inventory of TA6, in accordance with the present invention.

FIG. 6 illustrates process 600 consistent with the first embodiment of step 512, for producing a set of delete candidate data elements with an exemplary change backup set inventory 350. From the change backup set inventory 350, in step 640—every data set signature that was added is filtered out, and only the data sets' signature, that belongs to data sets which have been deleted, are extracted, as shown in list 642. Then list 642 is added in step 644 to the list of delete candidate data elements 610-1-610-7, to produce a newer version 611-1-611-9 of the delete candidate data elements.

When TA3, for example, expires; only the stored data element that is referenced in 611-1 (signature 7E63) can actually be deleted, as it is not required by any of the remaining backup revisions (TA1, TA2, TA4, TA5, TA6 of backup group 206, and of TB1-TB7 of backup group 208). Stored data element referenced in 611-5 (signature D43A) is not redundant and cannot be deleted, although it is not required by any of the remaining backup revisions of backup group 206 (TA1, TA2, TA4, TA5, TA6), it is required by TB1-TB6 of backup group 208.

When the most recently taken backup revision available for a certain backup group needs to get expired, another set is considered as the delete candidate data elements. This set includes all the stored data elements, which are needed by new data sets that have been added to the backup set during the recently taken backup revision available for this backup group. In one embodiment this set is produced by comparing the previously taken backup revision's full backup set inventory to the currently taken backup session's backup set inventory, which are available for this backup group, and extracting all the new data set signatures. Comparing items in a sorted list is well known to those familiar in the art and will not be detailed here. In another embodiment this set is produced by filtering out from the change backup set inventory of the current backup session, every data set that was removed (minus sign on the attribute field).

A stored data element which is needed by a data set that was added to the most recently taken backup revision available for a certain backup group has a chance of becoming redundant when that backup revision expires as it may not be needed to sustain the other backup revisions available for that backup revision. FIG. 4 illustrates data set 404-9 with the signature 617B, which was introduced to the backup set 204 during TB7. Therefore, when TB7 needs to get expired, then only the stored data element with the signature 617B is considered as a delete candidate data element.

When the only backup revision available for a certain backup group needs to get expired, then every stored data element that is needed by any data set that is referenced in the full backup set inventory of this backup revision is considered as candidate for delete.

Figure 5B:
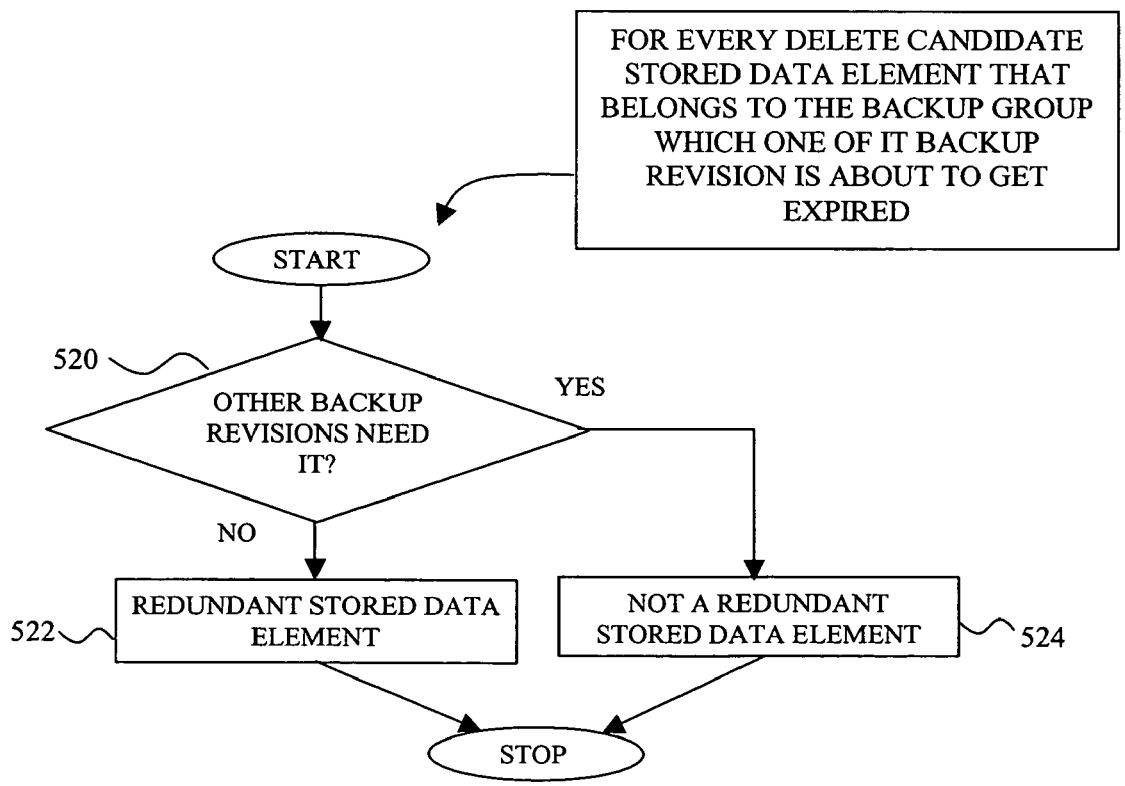
FIG. 5B is a general view of the backup system process during backup revision expiration, in accordance with the present invention.

FIG. 5B illustrates a top-level summary of the process that locates the stored data elements that become redundant as a result of the expiration of a backup revision. Every item, in the delete candidate data elements set that belongs to same backup group as the expired backup revision, is checked in step 520 to verify that it is not needed by any other backup revision which is available on the second tier storage 108. If the delete candidate data element is needed by any other backup revision, it is not a redundant stored data element, as illustrated at 524, and therefore it cannot be deleted from the second tier storage. If, however no other backup revision needs this delete candidate data element, it is a redundant stored data element, as illustrated at 522, and therefore it could be deleted from the second tier storage 108.

To locate which of the delete candidate data elements 611-X become redundant stored data elements as a result of expiring a backup revision TA3, for example, each such delete candidate data element should be checked at step 520 (FIG. 5B) to verify that no other full backup set inventory that belongs to the backup revisions TA1, TA2, TA4, TA5, TA6 and TB1-TB7 references a data set with the same content (signature). Searching for an item in a list of items is a well-known process for those who are familiar in the art an will not be detailed here. If such a stored data element is not needed by any other backup revision it can actually be deleted from the second tier storage 108, and its reference should also be cleared from the delete candidate data elements set.

Figure 7A:
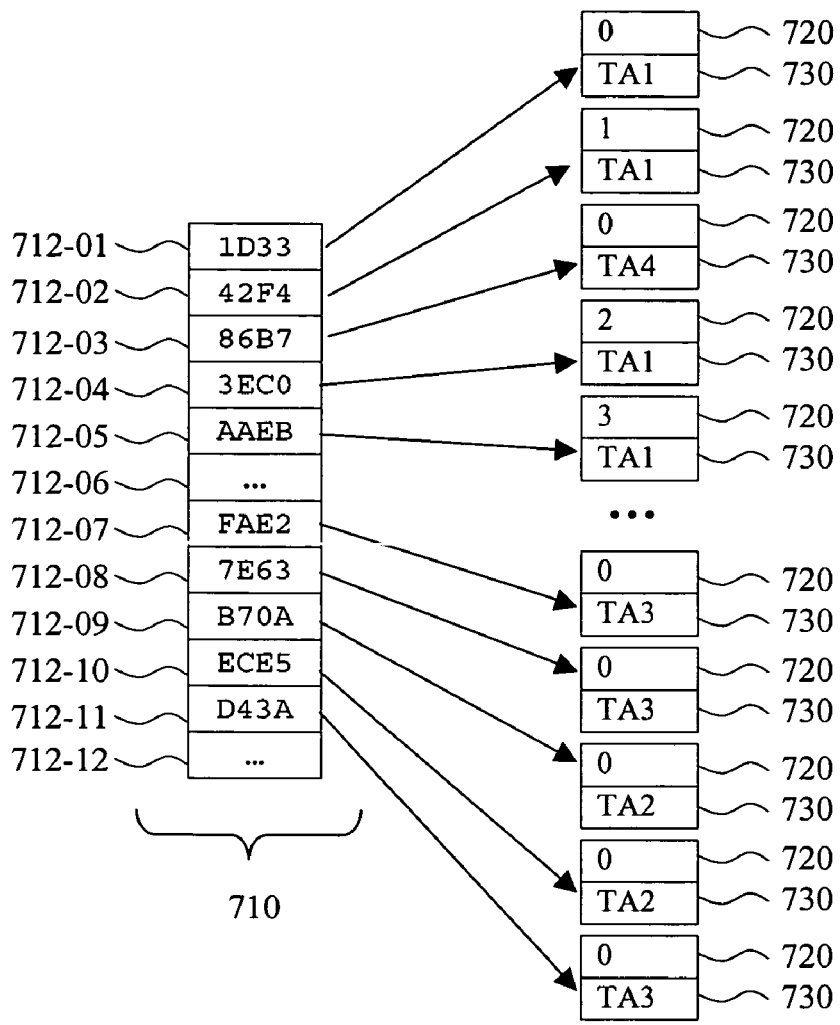
FIG. 7A is an exemplary illustration during TA6, of the data structures that are used in a second embodiment in accordance with the present invention.
Figure 7A:
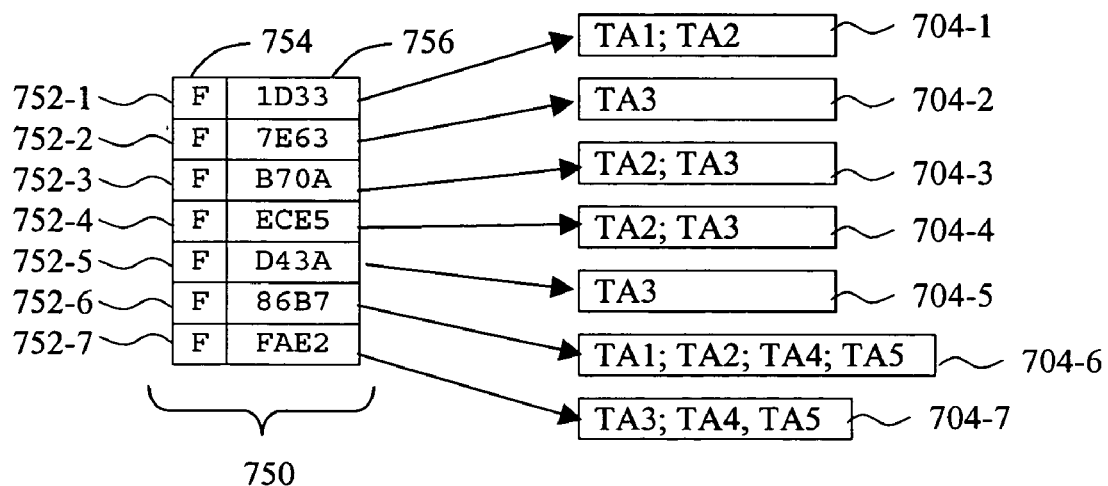

In a second embodiment of step 512, a data structure, which is illustrated in FIG. 7A, is used to further reduce the number of delete candidate data elements for each backup group. This is achieved by including only stored data elements that are needed by at least one of the backup revisions that belongs to the same backup group, and which are not needed by the recent backup revision available for this backup group. The set of delete candidate stored elements that is produced by the second embodiment is clearly smaller than the same set produced by the first embodiment, as if only one of two data sets that have an identical content changes, the stored data element which is needed by this changed data set will not become a candidate for delete as it would have became in the first embodiment.

FIG. 4 illustrates such a condition where the stored data element with the signature D11C would have become a part of the stored data elements delete candidate in the first embodiment, as during TB7 it did not appear in data set 404-8 as it did in TB6. However, in the second embodiment of 512, it will not be a part of the delete candidate data elements, as it is needed by the recent backup session (TB7) for the data set 404-4.

A 'stored data element signature index' exists for each backup group, and it is used to hold the signatures of every unique stored data element that is saved on the second tier storage 108 to sustain any backup revision available in its backup group. Note that in an embodiment where the stored elements are encrypted this index will hold the signatures of the non-encrypted stored elements. The exemplary stored data element signature index 710 holds the signatures of stored data elements that are needed by the backup revisions that are available for backup group 206 (TA1-TA6). The signatures 712-01-712-12 correspond to the situation after backup revision TA6 has been indexed. A stored data element signature is held on this index as long as a backup revision is available for backup group 206, which bears at least one data set that has the same signature.

Each stored data element 712-01-712-12 in the exemplary stored data element signature index 710 points at a separate structure that has two items: 720 and 730. Item 720 holds the number of data sets on backup set 202, which in the recent backup revision (TA6) need the pointing stored data elements. While item 730 holds a reference to the first backup session, in which a data set that needs the pointing stored data element turned out recently in the backup set. A data set is said to turn out in the backup set in one of two cases: either it is the first backup session in which a data set that bears such a signature is part of the backup set; or if a the last data set bearing such signature ceased to be a part of the backup set in at least one backup revision, and then in another backup session a data set which bears this signature once again became a part of the backup set.

As can be seen from FIG. 3A, the data set 304-13 bore signature 86B7 during TA1 and TA2; however during TA3 it disappeared from the backup set and turned out again in data set 304-13 during backup revision TA4. This is why Item 730, which is pointed by the stored data element that has a signature 86B7 (712-03), holds a reference to backup revision TA4.

Item 730, which is pointed by the stored data element signature B70A (712-09), holds reference to backup revision TA2. As can be seen from FIG. 3A, the content of data set 304-8 bearing the signature B70A turned out in backup revision TA2. Item 720, which is pointed by the stored data element B70A, holds a zero, as during the backup revision TA6 no data set bore the signature B70A.

Item 730, which is pointed by stored data element AAEB (712-05), holds reference to backup revision TA1. As can be seen from FIG. 3A, backup revision TA1 was the first to hold a data set bearing the signature AAEB (in data set 304-2), and in the subsequent backup revisions a data set bearing this signature was always a part of the backup set. Item 720, which is pointed by the same stored data element signature B70A, holds 3, as during the backup revision TA6 a data set bearing the signature AAEB existed on the backup set in three different data sets, 304-2, 304-4 and 304-12.

An exemplary structure 750 includes items 752-1-752-7, wherein items that their flag in column 754 is set (holds 'F'), are holding the signatures in column 756 of the delete candidate stored data elements set. This exemplary set of delete candidate data elements reflects the situation after backup revision TA6 has been indexed. Each such stored element, points at an associated set of non-expired backup revisions (704-x) that still needs the stored data element.

When flag 754 is in reset condition (empty) for item 752-X, the item is not considered as delete candidate data element. The entries with the reset flag, are used to hold reference to stored data elements that have used to be candidate for delete for a while, but then in a subsequent backup revision a data set was found to need this stored data elements, and therefore the stored data element is not considered as candidate for delete any more. The references to these stored data elements are kept in structure 750 together with the references to the backup revisions that needed them in 704-X, for the possibility that in a future backup revision these stored data element will become once again delete candidates; then these backup revisions which have already been found to be needing the stored data element, will be appended to the new backup revisions that will be found to need this stored data element.

When there will not be any backup revision listed in the associated set 704-X, it means that backup group 206 no longer needs the stored data element that points at this set. As an example, after backup revision TA3 expires, the stored data elements which bear the signatures 7E63 and D43A, will not be needed any more by backup group 206. This is indicated by delete candidate item 752-2 and 752-5, which points at the associated sets 704-2 and 704-5 respectively, and each one of this set holds only TA3 as the backup revision that needs said stored data elements.

Figure 8A:
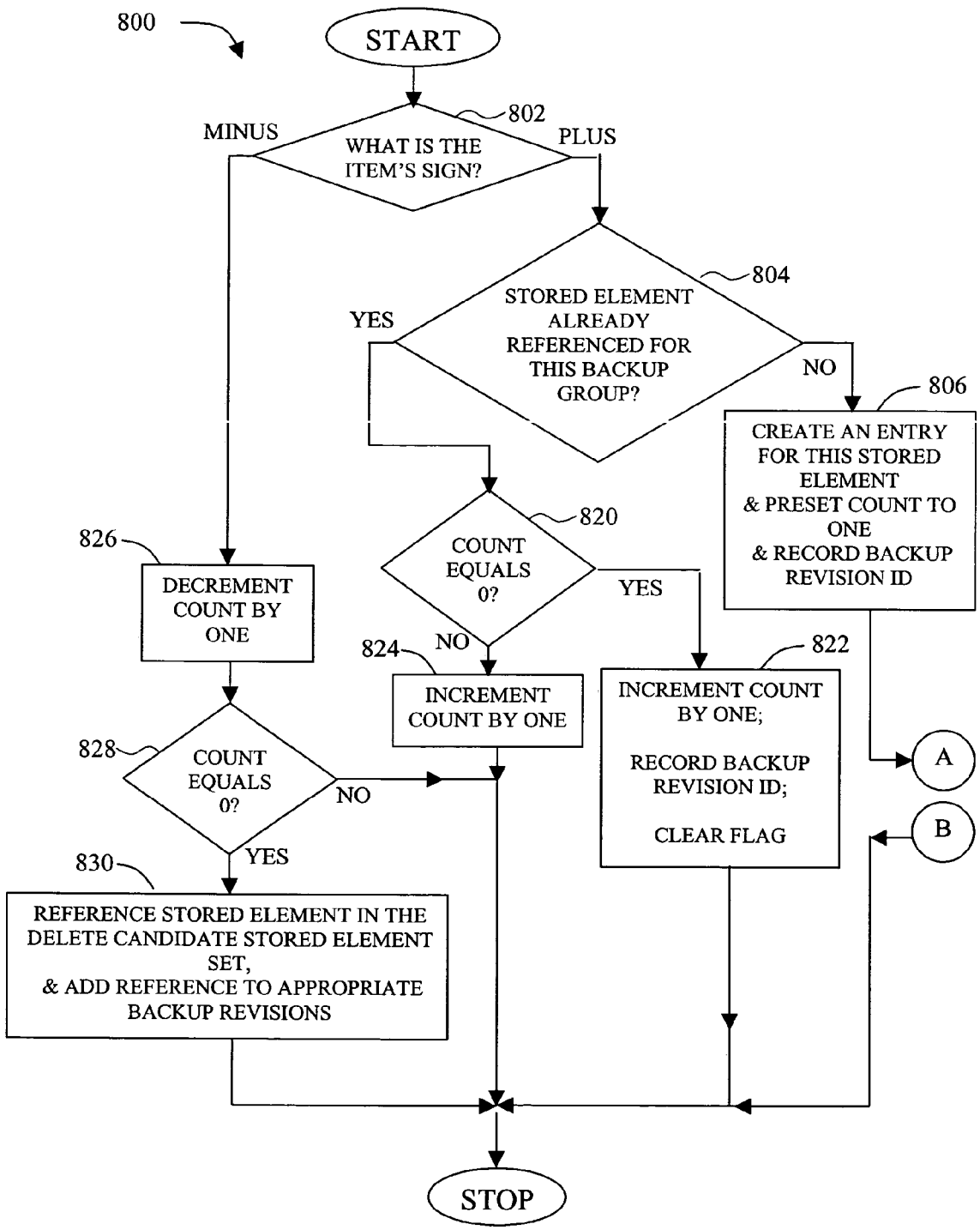
FIGS. 8A, 8B, and 8C details the indexation process the data structures of FIG. 7B, as would be performed is several embodiment in accordance with the present invention.

Process 800 as illustrated in FIG. 8A details one embodiment of the indexation process of the data structures used in the second embodiment of step 512. This process 800 is performed for each entry in the change backup set inventory of a new backup session. At step 802 the entry's attribute is checked, if it is a plus, then in step 804 the data set signature of this entry is searched in the stored data elements signature index. If the data set signature is not found in the stored data elements signature index, then at step 806 the stored data element signature is added to the stored data element signature index in a new node, the number of data sets on backup set is preset to one, and the current backup revision identification is recorded for the stored data element as will be exemplified below.

Figure 8B:
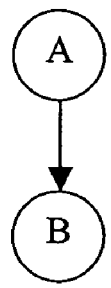

In this embodiment after performing step 806 the process continues in FIG. 8B where no action is taken before the process stops.

If during step 804 the data set signature is found in the stored data element signature index 710, then at steps 822 and 824 the number of data sets with the same signature, which is hosted at item 720 is incremented. If at step 820 the number of data sets with a signature equals to the pointing stored data element is tested to be zero, it means that this stored data element was a delete candidate. Then, at step 822 the backup revision identification will be updated in item 730 to hold the identification of the current backup session, and the flag 754 of this item is set to indicate that this stored data element is no longer a delete candidate, as it is needed by the current backup session.

If during step 802 the attribute of the change backup set inventory entry is found to be a minus, then the number of data sets with the same signature, which is hosted at item 720 is decremented during step 826. If this number is verified to be zero during step 828, which seems (the final judgment can be made only when all the change backup set inventory entries will be processed) that a data set with such a signature is not a part of the backup set during this backup session, then at step 830 the stored data element that has the same signature is added to the delete candidate data element set 750, and a set of every non-expired backup revision that belongs to the backup group, and which needs this stored data element is referenced to this element at 704-X.

This backup revisions set 704-X includes every backup revision that was taken since the backup revision had been recorded at step 806, and therefore they need this stored data element. If a previous set of backup revisions that needs this stored data element may already have existed for this stored data element (as can be verified by a non-flagged item of set 750 that have the same signature), it will be appended to the new set of backup revisions that needs the stored data element.

Data set 304-13 as illustrated in FIG. 3A had a signature 86B7 during TA1 and TA2, then during TA3 this data set did not bore this signature, and in fact no other data set during TA3 bore this signature. Therefore the stored data element that bears the signature 86B7 became a candidate for delete during TA3, and the backup revisions TA1 and TA2 should be recorded as the backup revisions that need this data set. Then at TA4 data set 304-13 bearing the signature 86B7 has turned out. Therefore, the flag at item 752-6 (FIG. 7A) should be set to indicate that this stored data element is no longer a delete candidate, and TA4 should be recorded in item 730 that belongs to the stored data element bearing the signature 86B7 (indexed at 712-03). At TA6 the data set 304-13 disappears from the backup set which causes its count to drop to zero again. Therefore the stored data element bearing the same signature will be noted as a delete candidate data element again and the former backup revisions TA1, TA2 will be appended to TA4 and TA6 as backup revisions that need it, as the final result can be seen at 704-6 of FIG. 7A.

Figure 7B:
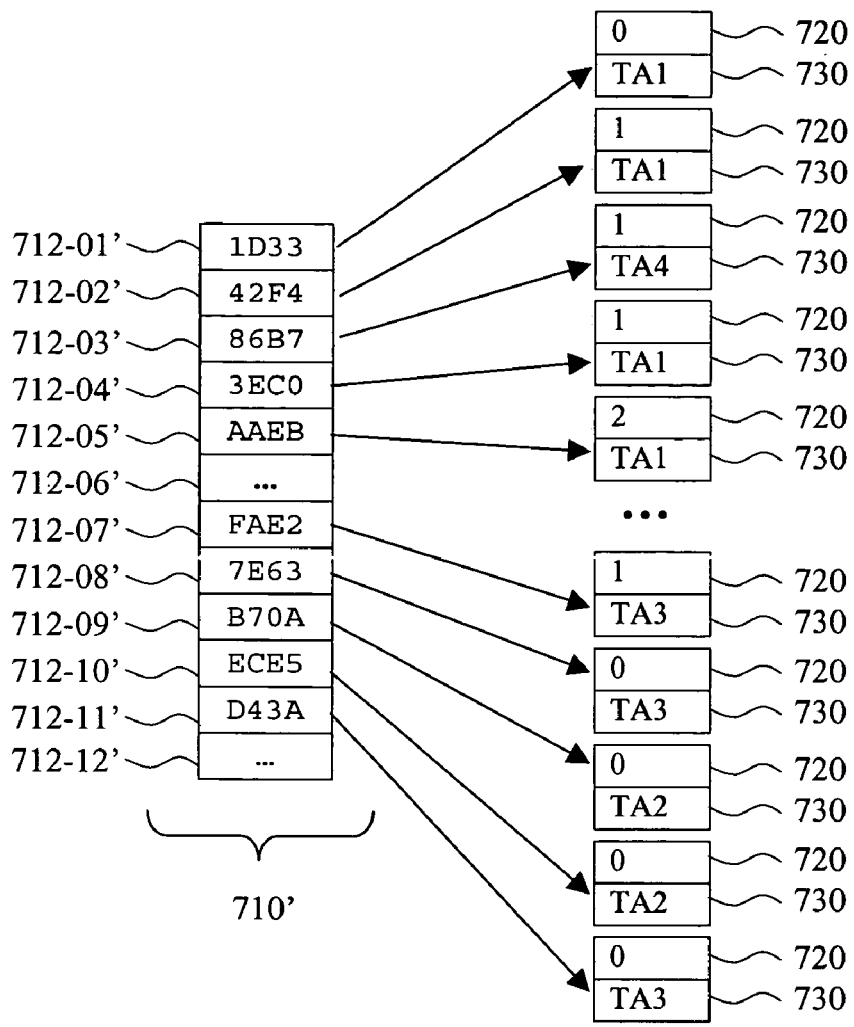
FIG. 7B is an exemplary illustration during TA5, of the data structures that are used in a second embodiment in accordance with the present invention.
Figure 7B:
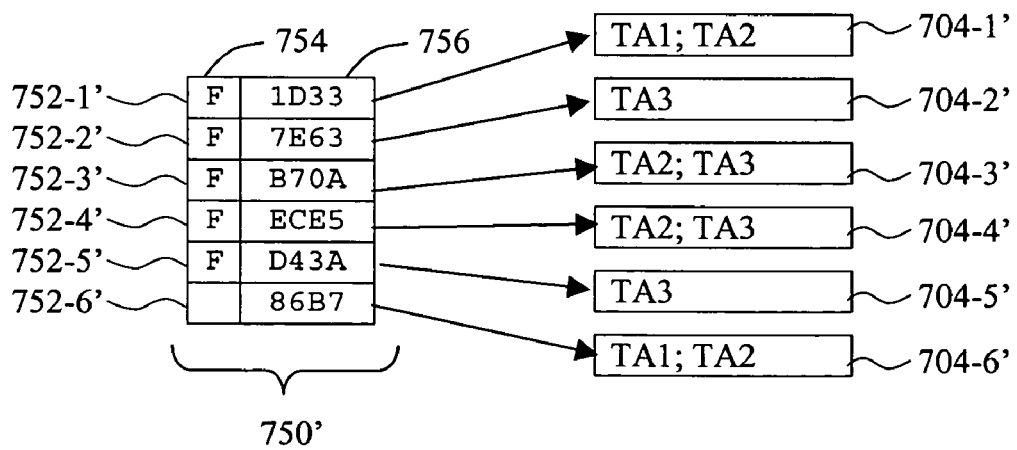

FIG. 7B illustrates stored data element signature index 710' and set 750', after backup revision TA5 has been indexed. FIG. 7A illustrates stored data element signature index 710 and set 750, after backup revision TA6 has been indexed. FIG. 3C, as mentioned above this document, illustrates the change backup set inventory 350 for TA6. The first entry 350-1 for example, indicates that the data set 316 does not bear the signature of FAE2 anymore as determined by the minus sign in its attribute field. During step 826 the number of data set bearing the signature FAE2 will be decremented from one to zero as can be seen in item 720 pointed by items 712-07 and 712-07' respectively (FIGS. 7B and 7A). Therefore, in step 830 entry 752-7 is added to the delete candidate data element set 750 with the signature FAE2, and a set of backup revisions TA3, TA4, and TA5 are referenced at 704-7. These backup revisions are added since backup revision TA3 was the first to bear a data set with such signature, as recorded in FIG. 7B item 730 that is associated to 712-07' of the stored data element signature index 710'.

In the second embodiment of step 512, to locate which of the delete candidate data elements for a certain backup group become redundant stored data elements as a result of expiring a backup revision that belongs to that backup group, each such delete candidate data element should be checked at step 520 (FIG. 5B) to verify that no other backup revision needs it before it can be realized as a redundant data element.

Figure 9A:
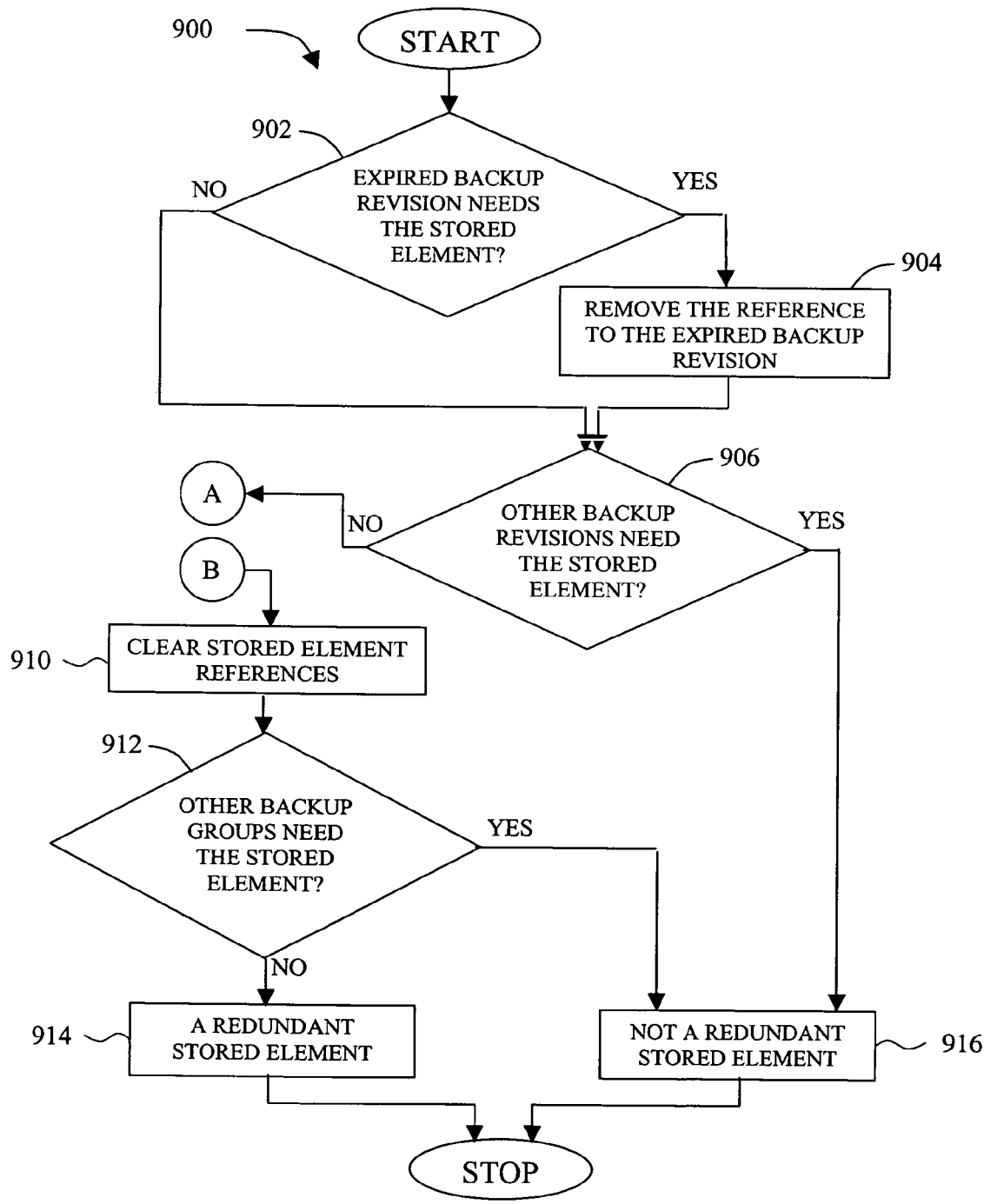
FIGS. 9A, 9B, and 9C details the expiration process of a backup session, as would be performed in several embodiments in accordance with the present invention.

FIG. 9A illustrates process 900 which details the process of FIG. 5B as would be performed for locating the redundant stored data elements from the delete candidate data elements as produced by the second embodiment of step 512. Process 900 is performed for each item in the delete candidate data element set. In step 902 it is checked whether the expired backup revision needs the stored data element (in 704-X) and if it does, then at step 904 its reference is removed from the associated set of backup revisions that need the data set.

Then in step 906, it is checked if any other backup revision, which belongs to this backup group, needs this stored data element. This step 906 is done by verifying that the associated set (704-X) of backup revisions that need the data set is empty. If there are backup revisions that need the stored data element, the process ends for this stored data element with the result, as can be seen in step 916, that it is not a redundant stored data element, and therefore it cannot be deleted from the second tier storage 108.

Figure 9B:
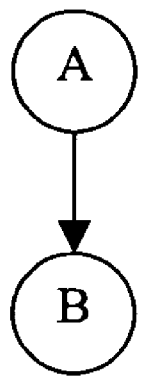

If in step 906 it is found that no other backup revision that belongs to this backup group needs the stored data element, then in this embodiment process 900 continues to step 910 as can be seen by FIG. 9B. At step 910 the stored data element reference is cleared from both the stored data element signature index 710, and from the delete candidate data element set. At step 912 it is tested whether other backup groups need this stored data element. This is done by verifying that a stored data element with such a signature does not exist in any other backup group's stored data element signature index 710. If such a stored data element is not found, then it is clear that there is no other backup revision that needs this stored data element, and as can be seen by step 914 it is a redundant stored data element which could be deleted.

If in step 912 it is found that there is at least one backup group that needs a stored data element with such a signature, then at step 916 it can be realized that this stored data element cannot be deleted.

In the preferred embodiment of step 512 an additional mean that further improves the search for redundant stored data element is added. This mean holds for each stored data element the backup groups that need it. A backup group is said to need a stored data element, if there is at least one non-expired backup revision that belongs to this backup group that needs the stored data element. This will improve step 912 of process 900 by reducing the search load for other backup groups that might still need the stored data element. Instead of searching through every stored data element signature index 710 of every backup group, it is enough to verify whether the stored data element has no backup group associated with it, which means the stored data element is not needed by any backup group and therefore can be deleted.

Figure 10:
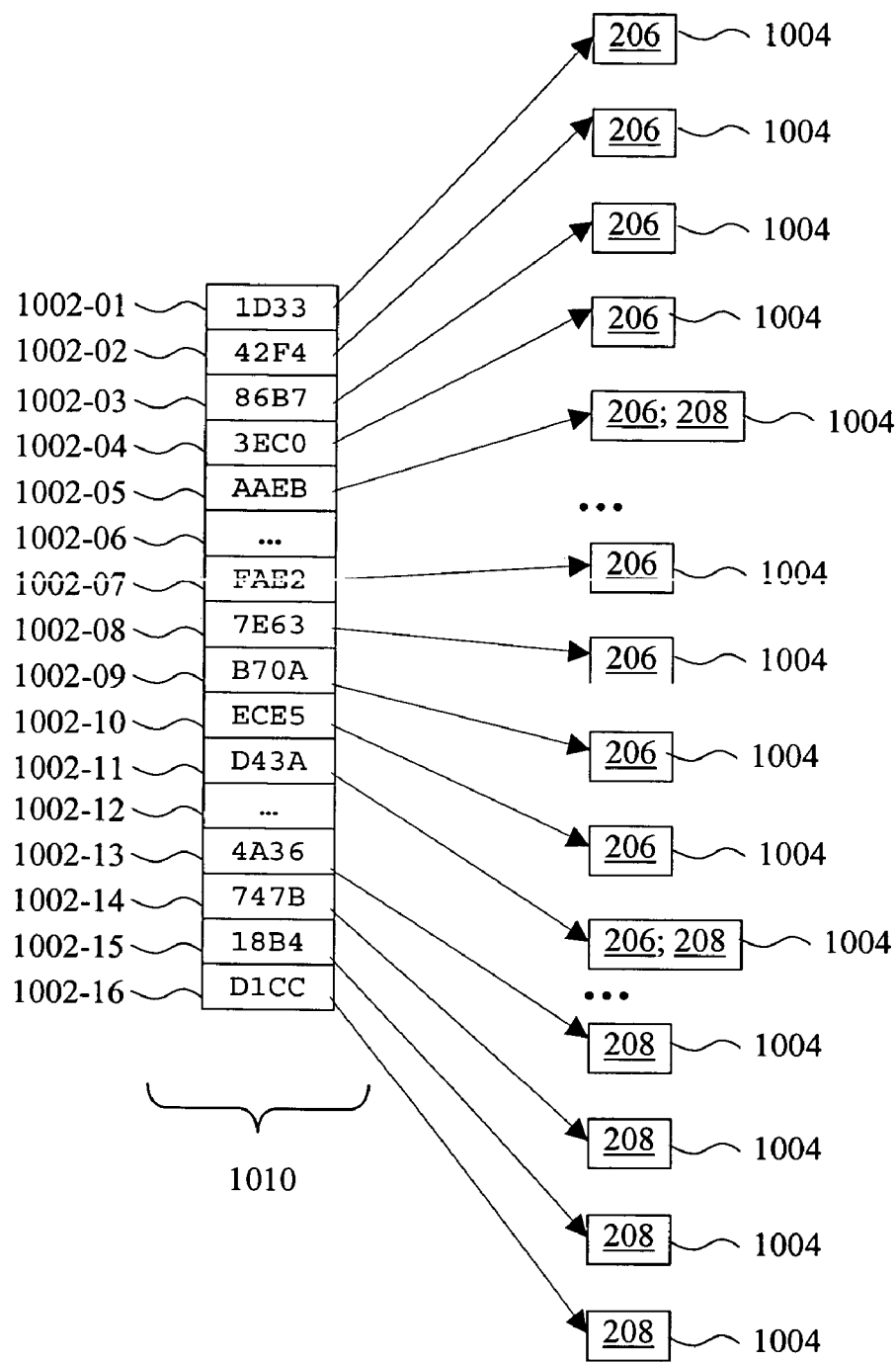
FIG. 10 illustrates an exemplary data structure that further improves the search for redundant stored data elements that is used in the preferred embodiment, in accordance with the present invention.

FIG. 10 illustrates for each one of the stored data elements 1002-1-1002-16, a set 1004 that contains the backup groups, which need the pointing stored data element. The actual data in this illustration exemplifies the situation after TA6 and TB7 was taken for both backup sets 202 and 204. Stored data element 1002-01, 1002-02, 1002-03, 1002-04, 1002-07, 1002-08, 1002-09, 1002-10 are needed only by backup group 206 as can be seen from FIG. 3 and FIG. 4, while 1002-13-1002-16 are needed only by backup group 208, and stored data elements 1002-05, 1002-11 are needed by both backup groups 206 and 208.

Figure 8C:
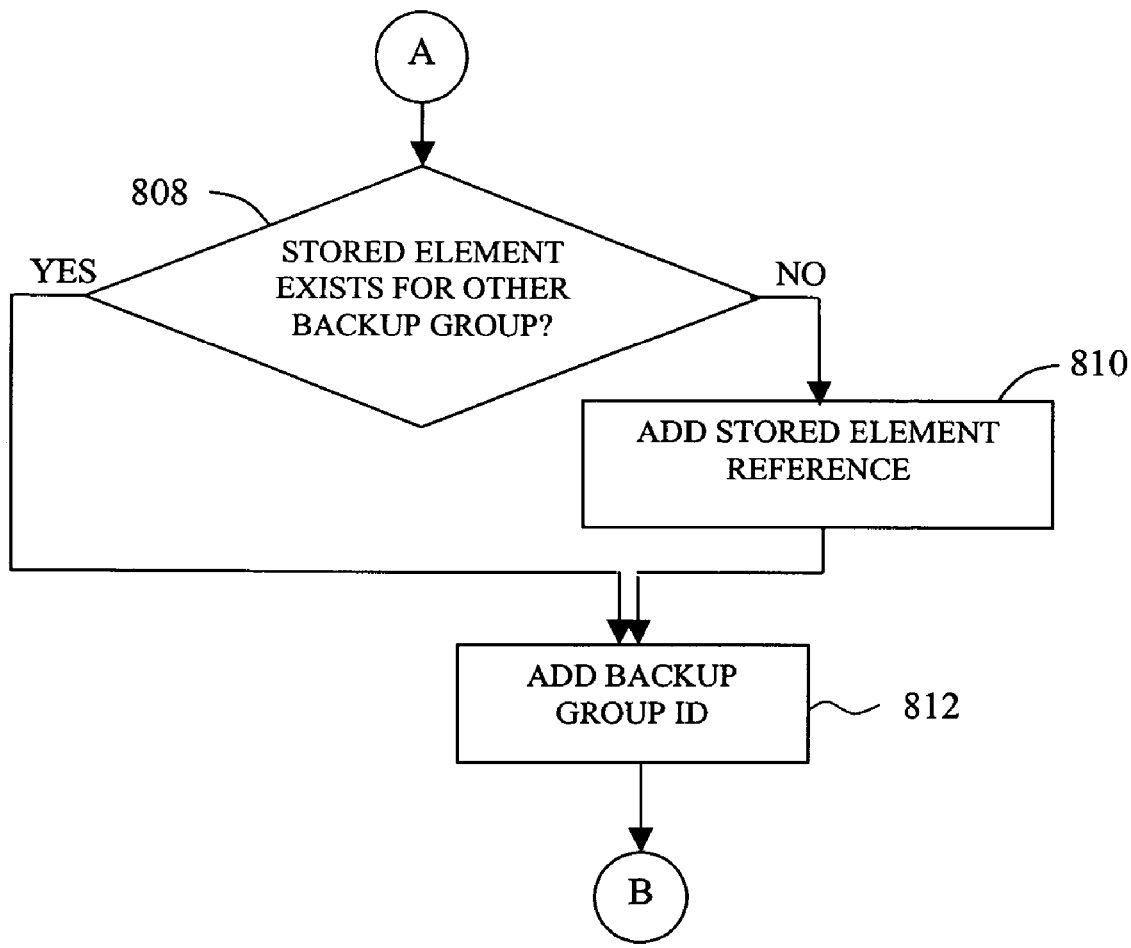

In this preferred embodiment of step 512—process 800 is modified. After performing step 806 the process continues as described by FIG. 8C where at step 808 it is checked whether the stored data element already referenced in the central stored data element signature index 1010. If it does not, then at step 810 it is added to the central stored data element signature index 1010, and at step 812 the backup group identification is added to the set 1004 of the backup groups that are associated with it.

Figure 9C:
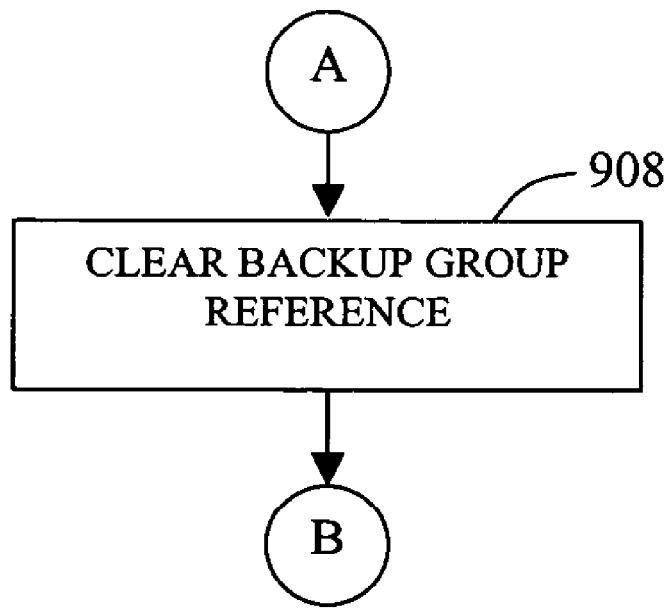

In this preferred embodiment of step 512—process 900, which locates the stored data element that can be deleted as a result of expiring a certain backup revision, is also modified. From step 906 it continues to step 908 as illustrated in FIG. 9C. In step 908 the backup group reference, which the current backup session belongs to, is removed from the set 1004 of the backup groups that need the stored data element. Step 912 is preformed by verifying whether the stored data element has no backup group identification associated with it in index 1010. This greatly reduces the load on the backup system as mentioned above.

In an alternative embodiment of step 511 a fall backup set inventory is sent for the first backup session, and then for every subsequent backup session only a change inventory is sent. This reduces the communication bandwidth needed, as only the references to the changes are sent for each backup session. Then, the backup system can reconstruct the full inventory for a certain backup revision, by integrating to the first backup set inventory—every change backup set inventory taken between the first backup and until the desired backup point.

3. Backup Revision Retention Management

The backup system 106 can also manage the retention of the backup revisions on the second tier storage 108, and then when a certain backup revision needs to get expired, it will engage the above mention methods to locate the stored data elements that can be deleted from the second tier storage 108.

In one embodiment every backup revision can be set up to be held on the second tier storage 108 for a certain period of time before it gets expired. In another embodiment each backup group can be set up to hold several backup revisions before the eldest backup revision get expired. In yet another embodiment each backup set can have several types of backup revisions such as daily, weekly and monthly. And each backup revision can be set up to hold several backup revisions for each such type of a backup revision before the eldest backup revision of each type get expired.

4. Relocating Backup Revisions to Third Tier Storage

The backup system 106 can also move or copy a certain backup revision to the third tier storage 118 in a predefined schedule. When a certain backup revision is moved to the third tier storage every stored data element that is referenced in the appropriate full backup set inventory is copied to the third tier storage. With methods disclosed above this document, then, the backup system 106 can locate every stored data element, which is uniquely needed to sustain this backup revision, and mark it for an immediate or later deletion from the second tier storage 108. The full backup set inventory of this archived backup revision will continue to be held on the backup system 106 as a reference to the content of every backup revision that is archived on the third tier storage 118.

5. Restore Operation

During a restore operation the full backup set inventory, as exemplified in FIG. 3B, is used as a reference for restoring a single file, a folder or a whole drive.

When a file needs to be restored to a certain version that is stored on the second tier storage 108, the differences between the corresponding data sets that composed the file during the backup session and the data sets that currently compose the file are located. Every data set that is found to be different is replaced with the corresponding data set that is stored in the second tier storage 108 for this revision. This is a standard operation in many backup systems and will not be detailed here.

What is claimed is:

1. A computer system for managing incremental backup revisions comprising:

a computer;

a data storage informationally coupled to said computer, said data storage configured to hold stored data elements associated with at least one backup revision;

a backup revision stored on said data storage, said backup revision comprising a plurality of backup sessions;

a full backup set inventory of said backup revision indentifying at least one stored data element associated with at least one backup session of said plurality of backup sessions;

a data set of said backup revision comprising said at least one stored data element; and computer executable program capable of running on said computer, said program comprising instructions for:

computing a signature for said at least one stored data element;

associating said signature with said at least one stored data element;

determining if said stored data element has a non-zero probability of becoming a redundant stored data element as a result of an expiration of one of said plurality of backup sessions using said signature of said stored data element; and adding said probably redundant said stored data element to a set of delete candidate data elements.

2. The system of claim 1 wherein a signature is associated with said at least one stored data element, and further wherein an address of said stored data element on said data storage is a hash of said signature.

3. A method for managing incremental backup revisions in a computer system, said method utilizing a computer executable program running on a computer, said computer-executable program comprising instructions for:

creating a backup revision, said backup revision comprising a data set, said data set comprising at least one stored data element;

creating a full backup set inventory of said backup revision, said full backup set inventory associating said at least one said stored data element with said backup session and with said data set;

determining if said at least one stored data element has a non-zero probability of becoming a redundant stored data element as a result of an expiration of said at least one backup session;

adding said possibly redundant said stored data element to a change backup set inventory;

utilizing said change backup set inventory to identify a redundant stored data element associated with expiring said at least one backup session; and deleting said redundant stored data element from said backup revision when said associated at least one backup session expires.

4. The method of claim 3 wherein said stored data element is associated with at least one backup group.

5. The method of claim 3 wherein said at least one backup session is associated with at least one backup group.

6. The method of claim 3 further comprising: adding data to said stored data element if said stored data element changed since a prior backup session.

7. The method of claim 3 further comprising: adding to said stored data element only data elements of said data set which have changed since a prior backup session.

* * * * *